United States Patent [19]
Webster

[11] Patent Number: 4,922,951
[45] Date of Patent: May 8, 1990

[54] SERVICE TEE FOR CONNECTION TO A GAS OR WATER MAIN

[75] Inventor: Alan B. Webster, Bury, England
[73] Assignee: British GAS plc, England
[21] Appl. No.: 224,148
[22] Filed: Jul. 26, 1988
[30] Foreign Application Priority Data
  Aug. 3, 1987 [GB] United Kingdom .. 87.18360
[51] Int. Cl.⁵ .......................................... F16K 43/00
[52] U.S. Cl. .................................. 137/321; 137/315; 137/318; 285/39; 285/162; 285/197; 285/222; 285/901
[58] Field of Search ................. 285/39, 222, 196, 162, 285/338, 197, 901; 137/317, 318, 315, 321

[56] References Cited

U.S. PATENT DOCUMENTS

| | | | |
|---|---|---|---|
| 3,349,792 | 10/1967 | Larkin | 285/197 X |
| 3,554,217 | 1/1971 | Ehrens | 285/197 X |
| 3,995,655 | 12/1976 | Sands | 285/197 X |

FOREIGN PATENT DOCUMENTS

| | | | |
|---|---|---|---|
| 0350512 | 1/1961 | Switzerland | 137/317 |
| 0236308 | 7/1925 | United Kingdom | 285/222 |
| 1139435 | 1/1969 | United Kingdom | 285/162 |
| 2051991 | 1/1981 | United Kingdom | 285/222 |
| 2103321 | 2/1983 | United Kingdom | 285/197 |

Primary Examiner—Dave W. Arola
Attorney, Agent, or Firm—Watson, Cole, Grindle & Watson

[57] ABSTRACT

A service tee comprises a tubular T-piece 1 having a through-portion 2 with a flexible lower end 6 for connection to a gas or water main 70 by way of a hole in the wall of the main and a side branch portion 3 for connection to a service pipe. The end 6 of the through-portion 2 is adapted for initial insertion into the hole in the wall of the main 70 and then for subsequent radial outward expansion so that its surface sealingly engages with the edge of the hole. An expander 4 is provided for location within the end 6 of the through-portion 2 and is adapted in a first position to permit initial insertion of the end of the through-portion into the hole and on movement to a second position to cause expansion of the end 6 into engagement with the edge of the hole. A plug 5 is also provided, the plug 5 being engageable with the expander 4 and adapted to move the expander 4 from its first to its second position, the arrangement being that after expansion the plug 5 can be moved from a first position where the end 6 of the through-portion 2 is closed off from the side branch portion 3 to a second position where the side branch portion 3 and the end 6 of the through-portion 2 can communicate.

4 Claims, 4 Drawing Sheets

SERVICE TEE FOR CONNECTION TO A GAS OR WATER MAIN

The present invention relates to a service tee for connection to a gas or water main which enables subsequent fluid communication between the main and a service pipe.

SUMMARY OF THE INVENTION

According to the present invention a service tee is provided which comprises a tubular T-piece having a through-portion with a flexible end for connection to a gas or water main by way of a hole in the wall of the main and a side branch portion for connection to a service pipe, the end of the through-portion being adapted for initial insertion into the hole in the wall of the main and then for subsequent radial outward expansion so that its surface sealingly engages with the edge of the hole, an expander for location within the end of the through-portion and adapted in a first position to permit the initial insertion of the end of the through-portion into the hole and on movement to a second position to cause the expansion of the end into engagement with the edge of the hole, and a plug engagable with the expander and adapted to move the expander from its first to its second position, the arrangement being that after expansion the plug can be moved from a first position where the end of the through-portion is closed off from the side branch portion to a second position where the side branch portion and the end of the through-portion can communicate.

An embodiment of the invention will now be particularly described with reference to the drawings.

DETAILED DESCRIPTION OF THE PREFERRED EMBODIMENT

Figure 1:
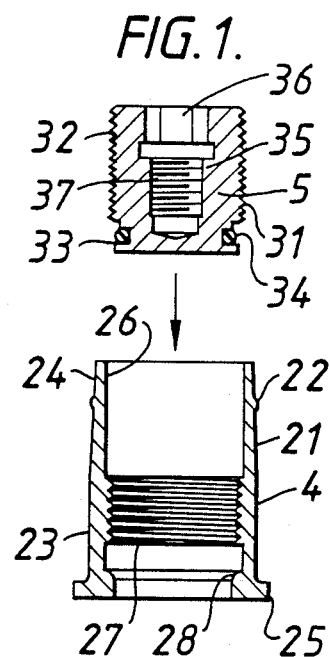
FIG. 1 is an axial view in section of a plug and expander.
Figure 2:
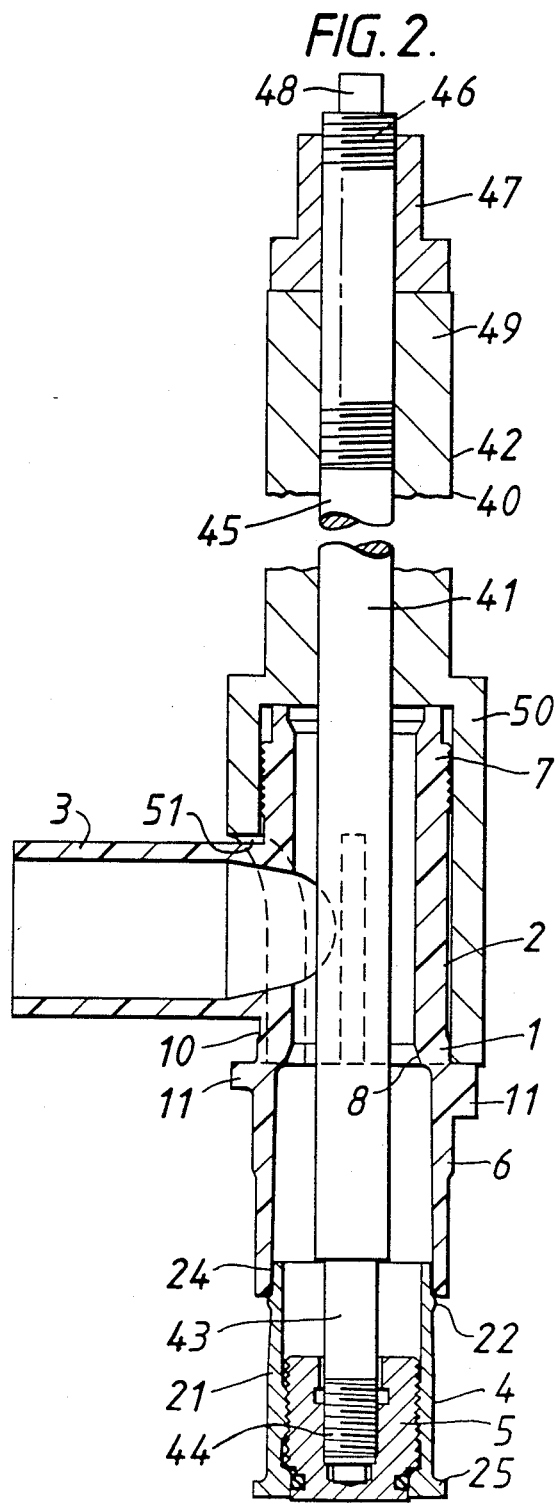
FIG. 2 is an axial view in section of an assembled tee and partly in section off a first tool showing the tee before insertion into a gas or water main.

Referring to the drawings, particularly FIGS. 1 and 2, the service tee comprises a tubular T-piece 1 having a through-portion 2 and a side branch portion 3, an expander 4 and plug 5.

The T-piece itself is of a generally flexible material such as plastic, preferably polyethylene.

The through-portion 2 comprises a first lower end 6 for receiving the expander 4 and for connection to a gas or water main and a second upper end 7 from which the side branch portion 3 extends radially.

The bore of the lower end 6 is generally larger than that of the upper end 7 and tapers slightly inwardly in the upward direction to form a shoulder 8 at the junction with the upper end 7.

Figure 5:
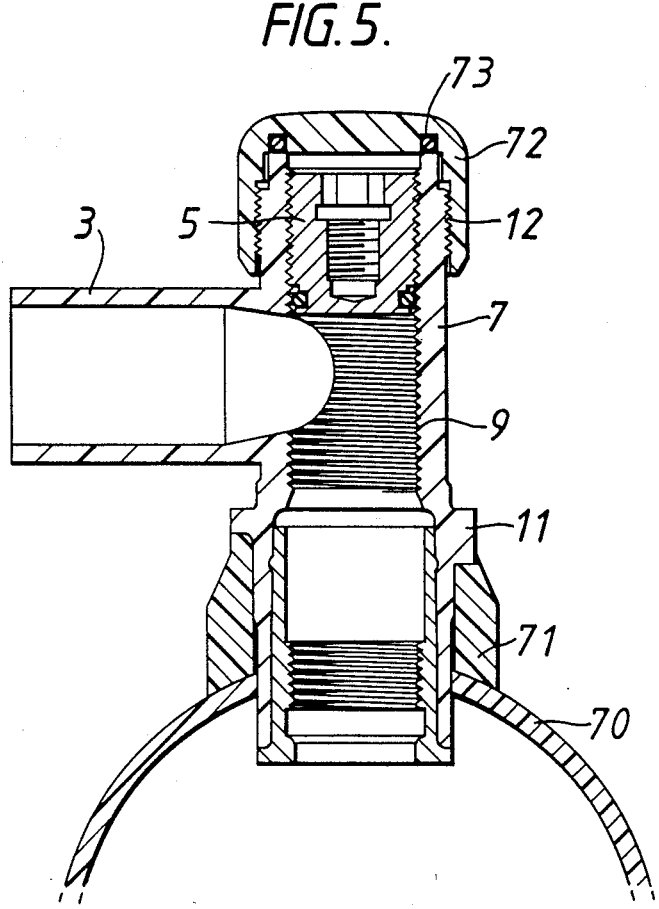
FIG. 5 is a view similar to FIG. 4 showing the plug in its second position within the bore of the T-piece through-portion.

As shown in FIG. 5 the internal wall 9 of the upper end 7 is threaded to form a seat for the plug 5 on movement to its second position. In this description unless otherwise stated all threads are right-hand The outer wall 10 of the through-portion 2 is also provided with an annular rib 11 level with the shoulder 8 for purposes to be described. A part 12 of the outer wall 10 of the through-portion 2 adjacent the opening in the upper end 7 is also threaded for a purpose also to be described.

The expander 4 is tubular and is of metal, for example mild steel. The outer diameter of the expander 4 tapers inwardly in an upward direction and is such that on being inserted into the lower end 6 of the through-portion 2 and on being raised within the lower end 6, the latter is caused to be distorted radially outwardly. To assist this process the outer wall 21 of the expander 4 has an annular rib 22 for engaging the inner wall of the lower end 6 of the through-portion 2. The rib 22 provides a boundary between a lowermost part 23 of the outer wall 21 of the expander 4 and an uppermost part 24 of the outer wall 21.

The uppermost part 24 of the wall 21 is as shown in FIG. 2 dimensioned to fit within the lower end 6 with the lowermost part 23 of the expander 4 being dimensioned to cause gradual radial expansion of the lower end 6.

The lowermost part 23 of the expander wall 21 terminates in an annular flange 25 which in use provides a limit to the upward movement of the expander 4 by eventually engaging with the circumferential lower edge of the lower end 6 of the through-portion 2.

The inner wall 26 of the expander 4 has an internally threaded portion 27 to receive and retain the plug 5 and forms at its lowermost end an annular shoulder 28 to retain the plug 5 as will subsequently be described.

The plug 5 is generally cylindrical and has an outer wall 31 having a larger diameter threaded uppermost part 32 to engage the threaded inner wall portion 27 of the expander 4 and a smaller diameter lowermost part 33 which in use fits within the annular shoulder 28 of the expander 4. The lowermost part 33 has an annular recess containing an O-ring 34 forming a seal with the expander shoulder 28.

Extending axially into the plug body 5 from its uppermost surface is a blind hole 35 which has an entry portion 36 in the form of an hexagonal key-hole and an innermost portion 37 having a partly-threaded wall. The threads in the portion 37 are left-hand and as will be shown permit the plug 5 to be engaged by a first tool to be described serving to raise the expander 4 within the lower end 6 of the T-piece through-portion 2 when the plug 5 has been threadedly located within the expander 4 and the latter is inserted within the lower end 6 of the T-piece through-portion 2. The key-hole portion 36 permits the plug 5 to be engaged by a second tool to be described serving to unscrew the plug from the expander 4 and then screw it up into the upper end 7 of the through-portion 2 past the junction with the side branch portion 3 as will be subsequently described.

Figure 3:
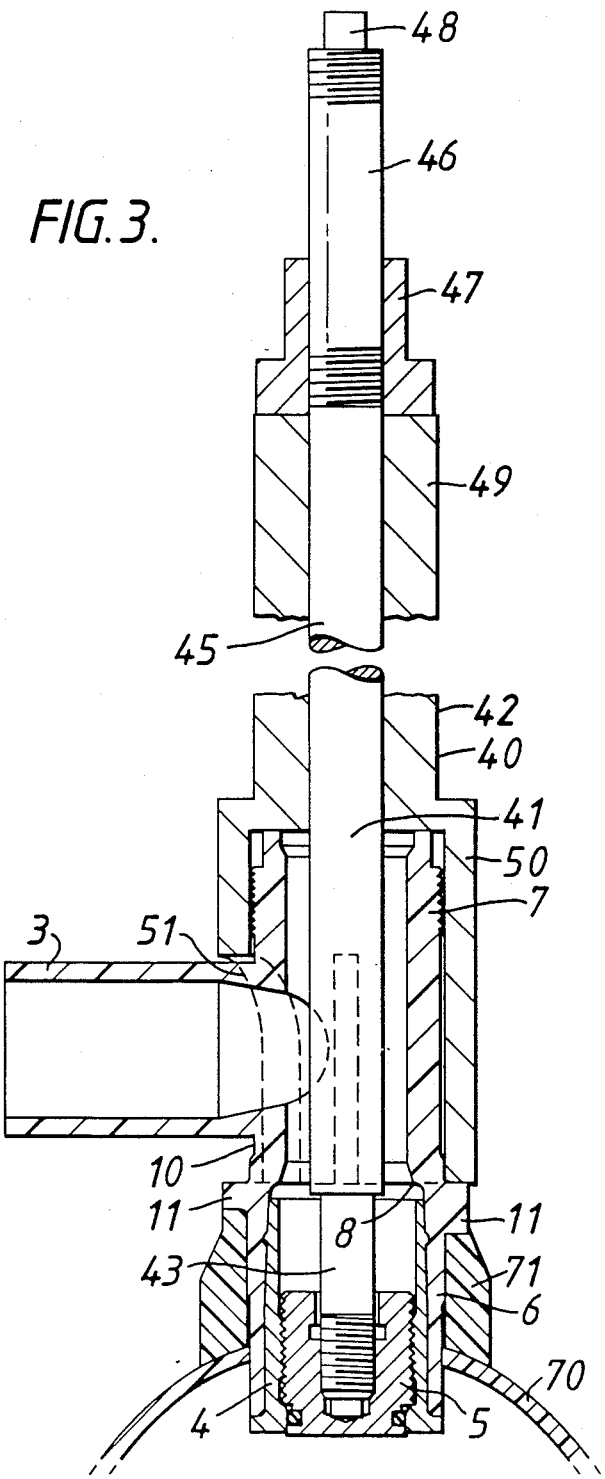
FIG. 3 is a view similar to FIG. 2, showing the tee after insertion and expansion.

Referring to FIGS. 2 and 3 the first tool 40 comprises an assembly of a shaft 41 and a tubular sleeve 42 in which the shaft 41 can be mounted for axial slidable movement. The shaft 41 comprises a lowermost portion 43, the end 44 of which is threaded with left hand threads for engagement with the threaded portion 37 of the plug hole 35. The shaft 41 also comprises an uppermost portion 45 which is of slightly larger diameter than the lowermost portion 43 and has a threaded end 46 on which may be screwed a flanged nut 47. The threaded end 46 terminates in a square head 48 to permit the shaft 41 to be engaged by a spanner to screw the shaft 41 into or out of the plug. The sleeve 42 comprises adjoining uppermost and lowermost portions 49 and 50, the ends 45,46 of the shaft protruding beyond their respective sleeve portions 49,50. The uppermost sleeve portion 49 has a bore with which the uppermost shaft portion 45 is a close slidable fit to maintain the axial alignment of the shaft 41.

The lowermost sleeve portion 50 has a bore which is dimensioned to permit the portion 50 to fit closely over the upper end 7 of the T-piece through-portion 2 as shown in FIGS. 2 and 3, the sleeve portion 50 having a slot 51 extending upwardly from its lowermost edge so as in use to permit the sleeve portion 50 to fit over the side branch portion 3. In use the lowermost edge of the sleeve portion 50 abuts the annular rib 11 of the through-portion 2.

The flanges nut 47 in use bears against the uppermost edge of the sleeve portion 49 so that when the nut 47 is rotated in the appropriate direction the shaft 41 is raised.

Figure 4:
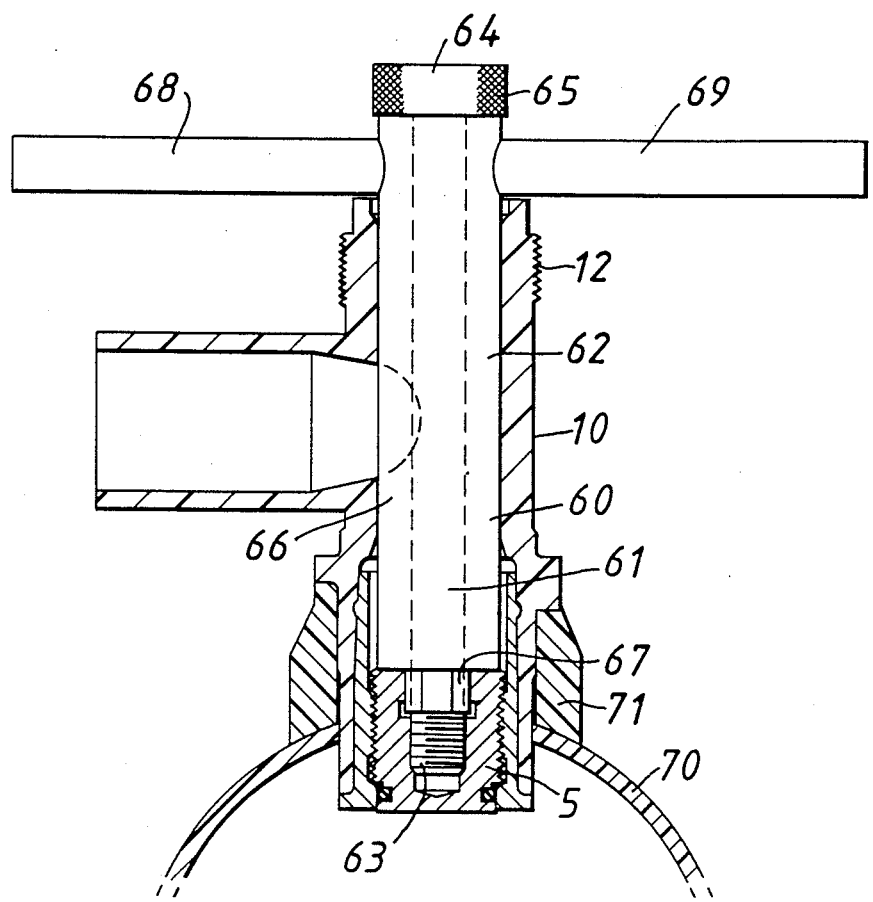
FIG. 4 is a view similar to FIG. 3 showing the plug about to be moved from its first position within the expander by means of a second tool.

Referring to FIG. 4 the second tool 60 comprises an assembly of a shaft 61 and a sleeve 62 in which the shaft 61 can be slidably mounted. The shaft 61 has a threaded lower end 63 adapted to engage the threaded portion 37 of the blind hole 35 in the plug 5. The upper end of the shaft 61 terminates in a knob 64 to permit the shaft 61 to be finger-screwed into and out of the plug 5. The knob 64 has a knurled edge 65 to enable it to be gripped firmly with the fingers.

The sleeve 62 has a tubular body 66 dimensioned to fit closely within the bore of the T-piece through-portion 2, which body 66 terminates at its lower end in an hexagonal key portion 67 adapted to engage in the corresponding key-hole 36 in the plug hole 35. The key-portion 67 is apertured centrally to allow the threaded end 63 of the shaft 61 to extend therethrough. The body 66 is also provided adjacent its uppermost end with two radially directed but opposite handles 68,69 to permit the sleeve 62 to be rotated about its axis to screw the plug 5 upwardly into the through-portion 2 as will be subsequently described.

The service tee may be connected to a gas or water main in the following manner.

A suitable hole is drilled in the wall of the gas or water main 70 (FIGS. 3 to 5) using a standard under-pressure drilling machine (not shown) in combination with a standard plate valve (not shown) temporarily connected to the wall of the main 70. After the hole has been drilled, the machine is removed and the plate in the plate valve is closed.

The plug 5 is then screwed down into the expander 4 until the plug O-ring 34 forms a fluid tight seal with the expander shoulder 28 (as for example shown in FIGS. 2 and 4). The plug 5 may be screwed tightly into the expander 4 by means of the key portion 67 of the sleeve part 62 in tool 60, the tool shaft 61 having been temporarily removed.

The expander and plug assembly are then inserted into the lower end 6 of the through-portion 2 (see FIG. 2) and with the flanged nut 47 temporarily removed, the tool 40 is lowered into position over the upper end 7 of the T-piece through-portion 2 and the lower end 44 of the shaft 41 is screwed into the threaded portion of the plug hole 35. The flanged nut 47 is then screwed onto the upper end 46 of the shaft 31. The position is now that shown in FIG. 2.

A plastic material, e.g., polythene tee saddle 71 of known type (FIG. 3) shaped to conform to the main 70, is push-fitted onto the lower end 6 of the T-piece through-portion 2 until it engages with the lowermost edge of the annular rib 11, the saddle 71 being dimensioned to leave a depending portion of the through-portion lower end 6 for insertion into the hole in the main 70.

The plate valve is then opened and the lower end 6 of the service tee is inserted into the hole in the main 70. The flanged nut 47 is then rotated in a direction which causes the shaft 41 to be lifted, thus forcing the expander 4 to travel up inside the lower end 6 of the through-portion 2 and cause the lower end 6 to flex outwardly to seal against the edge of the hole - the position shown in FIG. 3. At this stage the connection between the tee and the main has been made.

The flanged nut 47 is then removed from the upper end 46 of the shaft 41 and this latter is unscrewed from the plug 5 and removed together with the sleeve 42.

If it is now desired to provide a fluid connection between the main and a service pipe, the sleeve 62 (with the shaft 61 temporarily removed) is lowered into the bore of the through-portion 2 through the opening in the upper end 7 and its key-portion 67 is located in the key-hole portion 36 of the plug 5. The shaft 61 is then fitted into the bore of the sleeve 62 and its threaded end 63 is located in the threaded portion 37 of the plug-hole 5 so as to centre the tool sleeve 62—the position shown in FIG. 4. The tool sleeve 62 is then rotated by the handles 68,69 in a direction causing the plug 5 to be screwed upwardly into the threaded bore of the through-portion 2 and finally into the position shown in FIG. 5, i.e., at a point in the upper end 7 of the through-portion 2 past the service branch portion 3. Communication is now established between the through-portion 2 and the service branch portion 3 to which of course, a service pipe will have been suitably connected. Finally an internally threaded sealing cap 72 is screwed onto the upper end 7 of the through-portion 2 as shown in FIG. 5 to form a seal with the uppermost circumferential edge of the through portion 2 by means of the internal O-ring seal 73.

I claim:

1. In a service tee which comprises a tubular T-piece having a through-portion with a flexible first end for connection to a gas or water main by way of a hole in the wall of the main, an opposite second end, and a side branch portion between the first end and the second end for connection to a service pipe, the first end of the through-portion being adapted for initial insertion into the hole in the wall of the main and then for subsequent radial outward expansion so that its surface sealingly engages with an edge of the hole, means for expanding said first end including an expander for location within the first end of the through-portion and adapted in a first position to permit the initial insertion of the first end of the through-portion into the hole and on movement to a second position to cause the expansion of the first end into engagement with the edge of the hole, the improvement wherein said service tee includes plug means which is engagable with the expander and which includes engagement means which enables the plug means to be engaged by and moved by a first tool so as to move the expander from its first to its second position and, after expansion of the expander, enables the plug means to be engaged by and moved by a second tool from a first position where it seals the first end of the through-portion from the side branch portion to a second position which allows communication between the side branch portion and the first end of the through-portion.

2. In a service tee as claimed in claim 1, wherein the first position of the plug means is within the expander and the second position is within the bore of the through-portion at a point between the side branch portion and the second end of the through-portion.

3. In a service tee as claimed in claim 1, wherein said plug means includes a blind bore therein defining an entry portion and an innermost portion, said entry portion forming a key hole for said second tool and said innermost portion being internally threaded, thereby providing said engagement means for said first and second tools.

4. In a service tee as defined in claim 3, wherein said entry portion of said blind bore in said plug means provides a hexagonal key hole.

* * * * *